United States Patent
Ponticiello et al.

(10) Patent No.: US 11,091,599 B2
(45) Date of Patent: Aug. 17, 2021

(54) COMPOSITIONS OF EXPANDABLE VINYL AROMATIC POLYMERS WITH AN IMPROVED THERMAL INSULATION CAPACITY, PROCESS FOR THEIR PREPARATION AND EXPANDED ARTICLES OBTAINED THEREFROM

(75) Inventors: Antonio Ponticiello, Mozzecane (IT); Dario Ghidoni, Gonzaga (IT); Riccardo Felisari, San Giorgio di Mantova (IT)

(73) Assignee: VERSALIS S.p.A., San Donato Milanese (IT)

( * ) Notice: Subject to any disclaimer, the term of this patent is extended or adjusted under 35 U.S.C. 154(b) by 0 days.

(21) Appl. No.: 12/935,388

(22) PCT Filed: May 1, 2009

(86) PCT No.: PCT/EP2009/003448
§ 371 (c)(1),
(2), (4) Date: Nov. 2, 2010

(87) PCT Pub. No.: WO2009/135695
PCT Pub. Date: Nov. 12, 2009

(65) Prior Publication Data
US 2011/0046249 A1    Feb. 24, 2011

(30) Foreign Application Priority Data

May 7, 2008    (IT) .................... MI2008A000823

(51) Int. Cl.
*C08J 9/16* (2006.01)
*C08J 9/22* (2006.01)
*C08J 9/00* (2006.01)

(52) U.S. Cl.
CPC ......... *C08J 9/0066* (2013.01); *C08J 2201/03* (2013.01); *C08J 2203/06* (2013.01); *C08J 2203/14* (2013.01); *C08J 2203/142* (2013.01); *C08J 2325/04* (2013.01)

(58) Field of Classification Search
CPC .. C08J 9/0066; C08J 2201/03; C08J 2203/06; C08J 2203/14; C08J 2203/142; C08J 2325/04
USPC .......................... 521/56, 83, 146
See application file for complete search history.

(56) References Cited

U.S. PATENT DOCUMENTS

| | | | |
|---|---|---|---|
| 6,130,265 A * | 10/2000 | Glueck et al. | 521/56 |
| 6,340,713 B1 * | 1/2002 | Gluck et al. | 521/60 |
| 6,362,242 B1 * | 3/2002 | Gluck et al. | 521/56 |
| 6,455,599 B1 * | 9/2002 | Berghmans et al. | 521/58 |
| 7,612,119 B2 | 11/2009 | Ponticiello et al. | |
| 7,825,165 B2 | 11/2010 | Ghidoni et al. | |
| 2002/0120022 A1 * | 8/2002 | Lee | C08J 9/127 521/50 |
| 2005/0222357 A1 * | 10/2005 | Lanfredi et al. | 526/346 |
| 2006/0052466 A1 * | 3/2006 | Handa | C08J 9/04 521/99 |
| 2008/0234400 A1 * | 9/2008 | Allmendinger et al. | 521/57 |
| 2008/0248272 A1 | 10/2008 | Felisari et al. | |
| 2010/0148110 A1 | 6/2010 | Casalini et al. | |

FOREIGN PATENT DOCUMENTS

| | | |
|---|---|---|
| JP | 60-199062 A | 10/1985 |
| JP | 63-295651 A | 12/1988 |
| JP | 2004-191451 A | 7/2004 |
| JP | 2009-506150 A | 2/2009 |
| JP | 2010-527391 A | 8/2010 |
| SU | 1039937 | 9/1983 |
| WO | 97 45477 | 12/1997 |
| WO | 2006 056387 | 6/2006 |
| WO | 2006 061571 | 6/2006 |
| WO | 2007 023091 | 3/2007 |
| WO | 2008 141767 | 11/2008 |

OTHER PUBLICATIONS

Asbury Carbons—The World's Carbon and Graphite Source—Cokes, Mar. 7, 2008.*
MatWeb TIMCAL TIMREX® PC 40-OC Coke , 1996.*
TIMCAL Graphite & Carbon, Carbon Additives for Polymeric Compounds , Timcal Ltd, copyright 2012.*
T. Whlan "Polymer Technology Dictionary", Expanded Polystyrene, p. 141, Chapman & Hall, 1994.*
U.S. Appl. No. 13/393,843, filed Mar. 7, 2012, Ghidoni, et al.
U.S. Appl. No. 13/140,500, filed Aug. 12, 2011, Ponticiello, et al.
International Search Report dated Aug. 21, 2009 in PCT/EP09/003448 filed May 1, 2009.
U.S. Appl. No. 13/383,968, filed Feb. 28, 2012, Ponticiello, et al.
Office Action dated Oct. 17, 2013 in Japanese Patent Application No. 2011-507844 (with English language translation).

* cited by examiner

*Primary Examiner* — Irina S Zemel
(74) *Attorney, Agent, or Firm* — Oblon, McClelland, Maier & Neustadt, L.L.P.

(57) ABSTRACT

Expandable vinyl aromatic polymers which comprise: a matrix obtained by polymerizing 50-100% by weight of one or more vinyl aromatic monomers and 0-50% by weight of at least one copolymer izable monomer; 1-10% by weight, calculated with respect to the polymer (a), of an expanding agent englobed in the polymeric matrix; 0.05-25% by weight, calculated with respect to the polymer (a), of a filler comprising coke with a surface area, measured according to ASTM D-3037/89, ranging from 5 to 50 $m^2/g$.

23 Claims, No Drawings

COMPOSITIONS OF EXPANDABLE VINYL AROMATIC POLYMERS WITH AN IMPROVED THERMAL INSULATION CAPACITY, PROCESS FOR THEIR PREPARATION AND EXPANDED ARTICLES OBTAINED THEREFROM

The present invention relates to compositions of expandable vinyl aromatic polymers with an improved thermal insulation capacity, the process for their preparation and the expanded articles obtained therefrom.

More specifically, the present invention relates to granules based on expandable vinyl aromatic polymers, for example expandable styrene polymers which, after expansion, have a reduced heat conductivity also with a low density, for example lower than 20 g/l, and to the products thus obtained, i.e. expanded extruded sheets starting from said vinyl aromatic compositions.

Expandable vinyl aromatic polymers, and among these, in particular, expandable polystyrene (EPS), are known products which have been used for a long time for preparing expanded articles which can be adopted in various applicative fields, among which one of the most important is the field of heat insulation.

These expanded products are obtained by first swelling the polymer granules, in a closed environment, impregnated with an expandable fluid, for example an aliphatic hydrocarbon such as pentane or hexane, and then molding the swollen particles contained inside a mould, by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 30 g/l as the thermal conductivity of the polymer has a minimum at these values. It is not advantageous to fall below this limit, even if it is technically possible, as it causes a drastic increase in the thermal conductivity of the sheet which must be compensated by an increase in its thickness. In order to avoid this drawback, suggestions have been made to fill the polymer with athermanous materials such as graphite, carbon black or aluminium. Athermanous materials are in fact capable of interacting with the radioactive flow, reducing its transmission and thus increasing the thermal insulation of the expanded materials in which they are contained.

European patent 620,246, for example, describes a process for preparing beads of expandable polystyrene containing an athermanous material distributed on the surface or, as an alternative, incorporated inside the particle itself.

International patent application WO 1997/45477, describes compositions based on expandable polystyrene comprising a styrene polymer, from 0.05 to 25% of carbon black of the lamp black type, and from 0.6 to 5% of a brominated additive to make the product fireproof.

Japanese patent application 63183941 describes the use of graphite for improving the insulating capacity of polystyrene foams.

Patent application JP 60031536 describes the use of carbon black in the preparation of expandable polystyrene resins.

International patent application WO 2006/61571 describes compositions based on expandable polystyrene comprising a styrene polymer having a weight average molecular weight Mw of 150,000-450,000, from 2 to 20% by weight of an expanding agent and from 0.05 to less than 1% of carbon black with a surface area ranging from 550 to 1,600 $m^2/g$.

The Applicant has now found that it is possible to prepare a composition based on expandable vinyl aromatic polymers with enhanced thermo-insulating properties, using an athermanous additive which has never been described in literature.

An object of the present invention therefore relates to compositions of expandable vinyl aromatic polymers, for example in granules or beads, which comprise:
a) a polymeric matrix obtained by polymerizing a base comprising 50-100% by weight of one or more vinyl aromatic monomers and 0-50% by weight of at least one co-polymerizable monomer;
b) 1-10% by weight calculated with respect to the polymer (a), of an expandable agent englobed in the polymeric matrix;
c) 0.05-25% by weight, calculated with respect to the polymer (a), of an athermanous filler comprising coke, in particle form with an average diameter of the particles ranging from 0.5 to 100 μm, preferably from 2 to 20 μm, and with a surface area, measured according to ASTM D-3037/89 (BET), ranging from 5 to 50 $m^2/g$, preferably from 5 to 20 $m^2/g$.

The polymeric composition, object of the present invention can be obtained, as better illustrated hereunder, by means of:
a process in suspension, which comprises the dissolution/dispersion of the athermanous filler in the monomer base, followed by the polymerization in aqueous suspension and addition of the expanding agent; or
a direct extrusion process, i.e. feeding a mixture of granules of vinylaromatic polymer and athermanous filler (as such or in the master-batch form) directly to an extruder.

Alternatively, the polymer can already come in the molten state from a polymerization plant, subsequently adding the athermanous filler. The expanding agent is then fed and the relative product is subsequently cooled and passed through a die for the direct preparation also of plates, tubes, expanded sheets. Again alternatively, the polymeric composition thus obtained can be sent to a cutting die under pressure (for example according to the procedure described in U.S. Pat. No. 7,320,585).

The coke is available as a finely subdivided powder with a size (MT50) of the particles of powder ranging from 0.5 to 100 μm, preferably from 2 to 20 μm. The particle size (MT50) is measured with a laser granulometer and is the diameter which corresponds to 50% by weight of particles having a lower diameter and 50% by weight having a higher diameter.

The coke is produced by the pyrolysis of organic material and at least partly passes through a liquid or liquid-crystalline state during the carbonization process. The starting organic material is preferably petroleum, coal or lignite.

The coke used in the preparation of the polymeric compositions in granules, object of the present invention, is more preferably the carbonization product of the fraction of high-boiling hydrocarbons coming from the distillation of petroleum, conventionally known as the heavy residual fraction. In particular, the coke is obtained starting from the coking of the heavy residual fraction, an operation carried out at high temperature which again produces some light fractions and a solid (petroleum coke). The petroleum coke thus obtained is calcined at a temperature ranging from 1000 to 1,600° C. (calcined coke).

If a heavy residual fraction rich in aromatic components is used, a coke is produced after calcination at 1,800-2,200° C. with a needle crystalline structure (needle coke).

More information on coke, the production methods and characterization of the various grades commercially available (green coke, coal-derived pitch coke, delayed coke, fluid coke, needle coke, premium coke, calcined coke, shot, spange, etc.) are available in the web, in the website goldbook.iupuac.org or in Pure Appl. Chem., 1995, vol. 67, Nr. 3, pages 473-506 "Recommended terminology for the description of carbon as a solid (IUPAC Recommendations 1995)".

According to the present invention, the athermanous coke filler added to the vinyl aromatic polymer can comprise up to 5% by weight, calculated with respect to the polymer (a), for example from 0.01 to 5% by weight, preferably from 0.05 to 4.5%, of graphite and/or carbon black, respectively. The graphite, natural or synthetic, can have an average size (MT50) ranging from 0.5 to 50 with a surface area ranging from 5 to 50 m$^2$/g. The carbon black can have an average dimension ranging from 10 to 1,000 nm and a surface area of 5 to 40 m$^2$/g.

The term "vinyl aromatic monomer" as used in the present description and claims, essentially refers to a product having the following general formula:

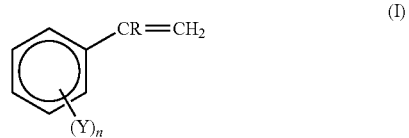

wherein R is a hydrogen or a methyl group, n is zero or an integer ranging from 1 to 5 and Y is a halogen, such as chlorine or bromine, or an alkyl or alkoxyl radical having from 1 to 4 carbon atoms.

Examples of vinyl aromatic monomers having the general formula mentioned above are: styrene, α-methyl styrene, methyl styrene, ethyl styrene, butyl styrene, dimethyl styrene, mono-, di-, tri-, tetra- and penta-chlorostyrene, bromostyrene, methoxystyrene, acetoxy-styrene, etc. Preferred vinyl aromatic monomers are styrene and α-methyl styrene.

The vinyl aromatic monomers having general formula (I) can be used alone or in a mixture of up to 50% by weight with other co-polymerizable monomers. Examples of said monomers are (meth)acrylic acid, $C_1$-$C_4$ alkyl esters of methacrylic acid, such as methyl acrylate, methyl methacrylate, ethyl acrylate, ethyl methacrylate, isopropyl acrylate, butyl acrylate, amides and nitriles of (meth)acrylic acid, such as acrylamide, methacrylamide, acrylonitrile, methacrylonitrile, butadiene, ethylene, divinyl benzene, maleic anhydride, etc. Preferred co-polymerizable monomers are acrylonitrile and methyl methacrylate.

Any expanding agent capable of being englobed in the vinyl aromatic polymeric matrix can be used in combination with the expandable expansible polymers object of the present invention. Typical examples are aliphatic hydrocarbons, Freon, carbon dioxide, alcohols such as ethyl alcohol, water, etc.

The athermanous filler comprising coke can be added to the vinyl aromatic polymer either through polymerization in suspension or in re-suspension, by means of the continuous mass technology or by direct extrusion, in such quantities that its final concentration in the polymer ranges from 0.05 to 25% by weight, preferably from 0.1 to 8%.

Conventional additives, generally used with traditional materials, such as pigments, stabilizing agents, nucleating agents, flame-retardant systems, antistatic agents, detaching agents, etc., can be added to the compositions of expandable polymers, object of the present invention. In particular, a flame-retardant system can be added to the present composition, comprising from 0.1 to 8%, with respect to the polymer (a), of a self-extinguishing brominated additive containing at least 30% by weight of bromine and from 0.05 to 2% by weight, again with respect to the polymer (a), of a synergic product containing at least one C—C or O—O labile bond, as described hereunder.

At the end of the addition of the athermanous filler, the expanding agent and possible additives, an expandable polymer is obtained in granules, which can be transformed to produce expanded articles having a density ranging from 5 to 50 g/l, preferably from 10 to 25 g/l. For direct extrusion, on the other hand, densities of 20 to 40 g/l are used.

These expanded articles have an excellent heat insulation capacity, expressed by a thermal conductivity ranging from 25 to 50 mW/mK, preferably from 30 to 45 mW/mK, which is generally even more than 10% lower with respect to that of equivalent expanded materials without fillers currently on the market, for example EXTIR A-5000 of Polimeri Europa SpA.

Thanks to these characteristics of the expandable polymers object of the present invention, it is possible to prepare heat-insulating articles with a significant saving of material or, for example, to prepare sheets with a lesser thickness than those prepared with traditional non-filled polymers, with a consequent saving in space and product.

Also included in the definition of expanded articles are expanded extruded sheets of vinyl aromatic polymers comprising a cellular matrix of a vinyl aromatic polymer, for example polystyrene, having a density ranging from 10 to 200 g/l, an average cell dimension ranging from 0.05 to 1.00 mm and containing from 0.05 to 25% by weight, calculated with respect to the polymer, preferably from 0.1 to 8%, of an athermanous filler comprising said coke in particle form with an average diameter of the particles (dimensional) ranging from 0.5 to 100 μm and a surface area, measured according to ASTM D-3037-89 (BET), ranging from 5 to 50 m$^2$/g, preferably from 5 to 20 m$^2$/g. The athermanous coke filler, added to the vinyl aromatic polymer of the expanded extruded sheet, can comprise up to 5% by weight, calculated with respect to the polymer, for example from 0.01 to 5% by weight, preferably from 0.05 to 4.5% respectively of said graphite and/or carbon black.

Conventional additives normally used with traditional materials, such as pigments, stabilizers, nucleating agents, flame-retardant agents, antistatic and detaching agents, etc., can also be added to said expanded extruded sheets.

A further object of the present invention relates to processes for the preparation of compositions based on expandable vinyl aromatic polymers, for example in beads or granules, having an improved thermal insulation and a density, after expansion, lower than 50 g/l.

In particular, a further object of the present invention relates to a process for preparing expandable vinyl aromatic polymers, in beads or granules, indicated above, which comprises the polymerization in an aqueous suspension of one or more vinyl aromatic monomers, possibly together with at least one polymerizable co-monomer in quantities up to 50% by weight, in the presence of an athermanous filler comprising said coke in particle form with an average diameter of the particles (dimensional) ranging from 0.5 to 100 µm and a surface area ranging from 5 to 50 $m^2/g$, preferably from 5 to 20 $m^2/g$, having the above-mentioned characteristics and at least in the presence of a peroxide radical initiator and an expanding agent added before, during or at the end of the polymerization.

The athermanous filler can also comprise up to 5% by weight, calculated with respect to the polymer, for example from 0.01 to 5% by weight, preferably from 0.05 to 4.5%, of said graphite and/or carbon black respectively. The synthetic or natural graphite can have a particle diameter ranging from 0.5 to 50 µm, with a surface area of 5-50 $m^2/g$. The carbon black can have an average particle diameter ranging from 10 to 1,000 nm, with a surface area of 5-40 $m^2/g$.

The polymerization is carried out in an aqueous suspension with inorganic salts of phosphoric acid, for example, tri-calcium phosphate or magnesium phosphate. These salts can be added to the polymerization mixture both finely subdivided or synthesized in situ by reaction, for example, between sodium pyrophosphate and magnesium sulphate.

Said inorganic salts are assisted in their suspending action by anionic surface-active agents, for example sodium dodecylbenzene sulfonate or their precursors such as sodium metabisulfite, as described in U.S. Pat. No. 3,631,014.

The polymerization can also be carried out in the presence of organic suspending agents such as polyvinylpyrrolidone, polyvinyl alcohol, etc.

The initiating system normally comprises two peroxides, the first with a halving time of an hour at 85-95° C. and the other with a halving time of an hour at 110-120° C. Examples of these initiators are tert-butylperoxy-2-ethyl-hexanoate and tert-butylperbenzoate.

The vinyl aromatic polymer or copolymer which is obtained has an average molecular weight Mw ranging from 50,000 to 250,000, preferably from 70,000 to 200,000. In general, more details on procedures for the preparation of expandable vinyl aromatic polymers in aqueous suspension or, more generally, polymerization in suspension, can be found in Journal of Macromolecular Science, Review in Macromolecular Chemistry and Physics C31 (263) 215-299 (1991).

To improve the stability of the suspension, it is possible to increase the viscosity of the reagent solution of vinyl aromatic monomers, to be suspended in water, by dissolving vinyl aromatic polymer therein, up to a concentration of 1 to 30% by weight, preferably from to 20%, calculated with respect to the monomer. The solution can be obtained by dissolving a preformed polymer in the reagent mixture (for example fresh polymer or waste-products from previous polymerizations and/or expansions) or by a mass pre-polymerization of the monomer, or blend of monomers, until the previously mentioned concentrations are obtained, and subsequently continuing the polymerization in aqueous suspension in the presence of the remaining additives.

During the polymerization in suspension, polymerization additives are used, according to methods well-known to experts in the field, which are typically those for producing expandable vinyl aromatic polymers, such as stabilizing agents of the suspension, chain-transfer agents, expansion co-adjuvants, nucleating agents, plasticizers, etc. In particular, during the polymerization, it is preferable to add an anti-flame system comprising flame-retardants, in a quantity ranging from 0.1 to 8% and synergic products in quantities ranging from 0.05 to 2% with respect to the resulting weight of the polymer. Flame-retardants particularly suitable for the expandable vinyl aromatic polymers object of the present invention are aliphatic, cyclo-aliphatic compounds, brominated aromatic compounds, such as hexabromocyclododecane, pentabromomonochlorocyclo-hexane and pentabromophenyl allyl ether. Synergic products which can be used are dicumyl peroxide, cumene hydroperoxide, 3,4-dimethyl-3,4-diphenyl-hexane, 3,4-dimethyl-3,4-diphenyl butane, 3,6,9-triethyl-3,6,9-trimethyl-1,4,7-triperoxyinonane.

The expanding agents are preferably added during the polymerization phase, or subsequently by means of the re-suspension technology. In particular, the latter comprises the phases of:
  polymerization in aqueous suspension of one or more vinyl aromatic monomers in the presence of at least the athermanous filler comprising coke;
  separation of the beads or granules thus obtained;
  re-suspension in water of the beads or granules and heating until their spherical form is obtained;
  addition to the suspension of expanding agents and keeping the beads in contact with the same until impregnation; and
  re-separation of the beads.

The expanding agents are selected from aliphatic or cyclo-aliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodifluoromethane, 1,2,2-trifluoro-ethane, 1,1,2-trifluoroethane; carbon dioxide; water; and ethyl alcohol.

At the end of the polymerization, substantially spherical beads/granules of expandable polymer are obtained, with an average diameter ranging from 0.2 to 2 mm, preferably from 1 to 1.5 mm, in which said athermanous filler, comprising coke, and said other possible additives, are homogeneously dispersed.

The granules are then discharged from the polymerization reactor and washed, in continuous or batchwise, with non-ionic surface-active agents or, alternatively, with acids, as described in U.S. Pat. No. 5,041,465. The polymer granules can be treated thermally with hot air ranging from 30 to 60° C.

A further object of the present invention relates to a process for preparing in continuous mass, compositions based on expandable vinyl aromatic polymers, in beads or granules, which comprises the following steps in series:
i. mixing a vinyl aromatic polymer in granular form or already in the molten state, with an average molecular weight Mw ranging from 50,000 to 250,000, preferably from 70,000 to 200,000, with an athermanous filler comprising said coke in particle form, with an average particle diameter ranging from 0.5 to 100 µm and a surface area ranging from 5 to 50 $m^2/g$, preferably from 5 to 20 $m^2/g$, having the above-mentioned characteristics. The athermanous filler can also respectively comprise up to 5% by weight, calculated with respect to the polymer, for example from 0.01 to 5% by weight, preferably from 0.05 to 4.5%, of said graphite and/or carbon black. The natural or synthetic graphite can have a particle diameter ranging from 0.5 to 50 µm, preferably from 1 to 15 µm, with a surface area of 5-50 $m^2/g$. The carbon black can have an average particle diameter ranging from 10 to 1,000 nm, with a surface area ranging from 5 to 40 $m^2/g$. Other possible additives, already described, among which pigments, stabilizers, nucleating agents, flame-retardant systems, antistatic agents, detaching agents, etc. can also be added in this step either totally or partially;

ii. optionally, if not already in the molten state, heating the vinyl aromatic polymer of mixture (i) to a temperature higher than the melting point of the vinyl aromatic polymer;
iii. incorporating said expanding agent and possibly a part or all of said other additives in the molten polymer;
iv. mixing the polymeric composition thus obtained by means of static or dynamic mixing elements; and
v. granulating the composition thus obtained in a device which comprises a die, a cutting chamber and a cutting system.

At the end of the granulation, beads/granules of expandable polymer can be obtained with a substantially spherical form having an average diameter ranging from 0.2 to 2 mm, preferably from 1 to 1.5 mm, in which the athermanous filler comprising said coke, and said other possible additives, proves to be homogeneously dispersed to the naked eye.

According to the present invention, step (i) can be effected by feeding the polymeric granule already formed, possibly mixed with processing waste products, in an extruder. Here, the single components are mixed and the polymeric portion is subsequently melted and an expanding agent and other possible additives are added.

Alternatively, the polymer can be used already in the molten state, coming directly from the polymerization plant (in solution), particularly from the relative devolatilization unit, according to a process known to experts in the field as "continuous mass process". The molten polymer is fed to suitable devices, for example a dynamic or a static mixer, where it is mixed with the additives, for example with the athermanous filler, and with the expanding agent and it is subsequently extruded to give the expandable beads/granules, object of the present invention.

The granules (or beads) of the polymeric composition can be annealed at a temperature lower than or equal to the glass transition temperature (Tg) or even slightly higher, for example the Tg increased up to 8° C., possibly under pressure. A detailed method for preparing vinyl aromatic polymers in continuous mass, is described in international patent application WO 03/53651.

In general, it is possible to incorporate at least said athermanous additives in a master-batch, based on a vinyl aromatic polymer having an average molecular weight Mw ranging from 50,000 to 250,000, preferably from 70,000 to 200,000, to facilitate their mixing with the polymeric stream and to simplify the plant management. In the master-batch, the content of athermanous filler, comprising said coke and possibly said carbon black and/or graphite, ranges from 15 to 60% by weight.

In particular, in the case of polymerization in aqueous suspension, the master-batch in pellets can be dissolved in the vinyl aromatic monomer. In the case of mass polymerization, on the other hand, the master-batch in pellet form can be mixed with the granule or with the polymer in the molten state coming from polymerization in solution.

Even more specifically, in the case of polymerization in continuous mass, the master-batch in pellets can be dissolved in the vinyl aromatic monomer/solvent mixture before this is fed to the polymerization reactor in solution.

At the end of the polymerization, whether it be in suspension or continuous mass, the expandable beads or granules obtained are subjected to pre-treatment which is normally applied to conventional expandable compositions and which essentially consists in:
1. covering the beads or granules with an antistatic liquid agent such as amines, ethoxylated tertiary alkylamines, ethylene oxide/propylene oxide copolymers, etc. Said agent allows the coating to adhere and facilitates the screening of the beads prepared in suspension;
2. applying the coating to said beads or granules, which essentially consists of a mixture of mono-, di- and tri-esters of glycerine (or other alcohols) with fatty acids, and metal stearates such as zinc and/or magnesium stearate, possibly also mixed with carbon black.

A further object of the present invention relates to a process for the production of expanded extruded sheets of vinyl aromatic polymers which comprises:
a1. mixing a vinyl aromatic polymer in the form of pellets or granules or beads and at least one athermanous filler comprising from 0.05 to 25% by weight, calculated with respect to the polymer, of said coke in particle form with an average diameter of the particles (dimensional) ranging from 0.5 to 100 µm and a surface area, measured according to ASTM D-3037-89 (BET), ranging from 5 to 50 $m^2/g$, preferably from 5 to 20 $m^2/g$;
b1. heating the mixture (a1) to a temperature ranging from 180 to 250° C. to as to obtain a polymeric melt which is subjected to homogenization;
c1. adding at least one expanding agent to the polymeric melt, and possibly said additives, for example said flame-retardant system;
d1. homogenizing the polymeric melt which englobes the expanding agent;
e1. homogeneously cooling the polymer melt (d1) to a temperature not higher than 200° C. and not lower than the Tg of the resulting polymeric composition;
f1. extruding the polymeric melt through a die in order to obtain an expanded polymeric sheet.

According to an embodiment of the process for the production of expanded extruded sheets, which is a further object of the present invention, the athermanous filler of coke added to the vinyl aromatic polymer can comprise up to 5% by weight, calculated with respect to the polymer, for example from 0.01 to 5% by weight, preferably from 0.05 to 4.5%, of said graphite and/or carbon black, respectively. The graphite, natural or synthetic, can have a particle diameter (MT50) ranging from 0.5 to 50 µm, with a surface area ranging from 5 to 50 $m^2/g$. The carbon black can have an average particle diameter ranging from 10 to 1,000 nm, with a surface area ranging from 5 to 40 $m^2/g$.

According to an alternative embodiment of the process for the production of expanded extruded sheets, object of the present invention, the vinyl aromatic polymer in pellet form is either totally or partially substituted by the compositions of vinyl aromatic polymers in beads/granules described or prepared according to one of the processes described above.

Also in the process for the production of expanded extruded sheets based on vinyl aromatic polymers, said athermanous filler can be used by means of said master-batch.

More details on processes for the preparation of expanded extruded sheets of vinyl aromatic polymers can be found in International patent application WO 06/128656.

Some illustrative and non-limiting examples are provided hereunder for a better understanding of the present invention and for its embodiment.

EXAMPLE 1

A mixture is charged into a closed and stirred container, consisting of 150 parts by weight of water, 0.2 parts of sodium pyrophosphate, 100 parts of styrene, 0.25 parts of tert-butylperoxy-2-ethylhexanoate, 0.25 parts of tert-butyl perbenzoate and 1 part of Calcinated Coke 4023 sold by the company Asbury Graphite Mills Inc. (USA), having a particle diameter MT50% of about 5 μm, a BET of about 20 m²/g. The mixture is heated under stirring to 90° C.

After about 2 hours at 90° C., 4 parts of a solution of polyvinylpyrrolidone at 10% are added. The mixture is heated to 100° C., still under stirring, for a further 2 hours, 7 parts of a 70/30 mixture of n-pentane and i-pentane are added, the whole mixture is heated for a further 4 hours to 125° C., it is then cooled and the batch is discharged.

The granules of expandable polymer thus produced are subsequently collected and washed with demineralized water containing 0.05% of a non-ionic surface-active agent consisting of a fatty alcohol condensed with ethylene oxide and propylene oxide, sold by Huntsman under the tradename of Empilan 2638. The granules are then dried in a warm air flow, 0.02% of a non-ionic surface-active agent is added, consisting of a condensate of ethylene oxide and propylene oxide on a glycerine base, sold by Dow (Voranol CP4755) and they are subsequently screened separating a fraction with a diameter ranging from 1 to 1.5 mm.

This fraction proved to represent 40%, 30% being the fraction between 0.5 and 1 mm, 15% the fraction between 0.2 and 0.5 mm, and 15% the gross fraction, between 1.5 and 3 mm.

0.20 of glyceryl monostearate and 0.1% of zinc stearate are then added to the fraction of 1 to 1.5 mm.

The product is pre-expanded with vapour at a temperature of 100° C., left to age for 1 day and used for the moulding of blocks (having dimensions of 1040×1030×550 mm).

The blocks were then cut to prepare flat sheets on which the thermal conductivity is measured. The thermal conductivity, measured after 5 days of residence in an oven at 70° C., was 35.0 mW/mK whereas that of a sheet having the same density (17 g/l) prepared with a traditional reference product (EXTIR A-5000) was equal to 40 mW/mK.

COMPARATIVE EXAMPLE 1

The same procedure is adopted as in Example 1 with the exception that the coke is substituted with carbon black N990 produced by Concarb (USA). This carbon has a diameter of the primary particles of about 230 nm and a surface area (BET) of about 12 m²/g.

The sheet obtained has a thermal conductivity of 36.5 mW/mK.

EXAMPLE 2

A mixture is charged into a closed and stirred container, consisting of 150 parts by weight of water, 0.2 parts of sodium tricalcium phosphate, 100 parts of styrene, 0.25 parts of tert-butylperoxy-2-ethylhexanoate, 0.25 parts of tert-butylperbenzoate, 0.01 parts of sodium metabisulphite and 2 parts of the coke used in example 1. The mixture is heated under stirring to 90° C.

After about 2 hours at 90° C., the mixture is heated for a further 2 hours to 100° C., 7 parts of a 70/30 mixture of n-pentane and i-pentane are added, the mixture is heated for a further 4 hours to 125° C., it is then cooled and discharged.

The granules of expandable polymer thus produced are processed as in example 1, separating the fraction with a diameter ranging from 1 to 1.5 mm.

This fraction proved to represent 60%, 25% being the fraction from 0.5 to 1 mm, 5% the fraction from 0.2 to 0.5 mm, and 10% the gross fraction, from 1.5 to 3 mm.

0.2% of glyceryl monostearate and 0.1% of zinc stearate are added to the fraction of 1 to 1.5 mm.

The expansion and moulding were effected as described in example 1. The thermal conductivity proved to be 34.5 mW/mK.

EXAMPLE 3

A mixture is charged into a closed and stirred container, consisting of 150 parts by weight of water, 0.2 parts of sodium tricalcium phosphate, 100 parts of styrene, 0.30 parts of tert-butylperoxy-2-ethylhexanoate, 0.25 parts of tert-butylperbenzoate, 0.01 parts of sodium metabisulphite and 4 parts of the coke used in example 1. The mixture is heated under stirring to 90° C.

After about 2 hours at 90° C., the mixture is heated for a further 2 hours to 100° C., 7 parts of a 70/30 mixture of n-pentane and i-pentane are added, the mixture is heated for a further 4 hours to 125° C., it is then cooled and discharged.

The granules of expandable polymer thus produced are processed as in example 1, separating the fraction with a diameter ranging from 1 to 1.5 mm.

This fraction proved to represent 60%, 25% being the fraction from 0.5 to 1 mm, 5% the fraction from 0.2 to 0.5 mm, and 10% the gross fraction, from 1.5 to 3 mm.

0.2% of glyceryl monostearate and 0.1% of zinc stearate are added to the fraction of 1 to 1.5 mm.

The expansion and moulding were effected as described in example 1. The thermal conductivity proved to be 33 mW/mK.

EXAMPLE 4

Example 2 was repeated substituting the Calcinated Coke 4023 with the type Needle Coke 4727 sold by Asbury Graphite Mills Inc. (USA) having a particle diameter MT50% of about 6 microns, a BET of about 11 m²/g. The thermal conductivity proved to be 34 mW/mK at 17 g/l.

EXAMPLE 5

Example 4 was repeated adding, in addition to 2% of coke 4727, 2% of Carbon Black N990, produced by Concarb (USA). The thermal conductivity proved to be 32.5 mW/mK at 17 g/l.

EXAMPLE 6

Example 3 was repeated adding 1.5% of hexabromocyclododecane, Saytex HP900 sold by Albmarle and 0.3% of dicumyl peroxide to make the product fireproof. The fraction of 1 to 1.5 mm is then processed as in Example 1. The sheets are put in an oven at 70° C. for 2 days to remove the residual pentane. Test samples are then collected (9 cm×19 cm×2 cm) for the fire behaviour test according to the regulation DIN 4102. The test samples pass the test. The thermal conductivity remains unvaried.

EXAMPLE 7

78 parts of polystyrene N1782 produced by Polimeri Europa; 2 parts of ethylene-bis-stereamide; 20 parts of Calcinated Coke 4023 used in Example 1, are mixed in a twin-screw extruder. The extruded product is used as masterbatch, in the production of the expandable compositions of the present invention illustrated hereunder.

89.8 parts of ethylbenzene, 730.0 parts of styrene, 56.2 parts of α-methylstyrene and 0.2 parts of divinylbenzene are fed to a stirred reactor.

123.8 parts of the master-batch prepared as indicated above are fed into the reactor and dissolved (total: 1,000 parts). The reaction is carried out at 125° C. with an average residence time of 2 hours. The fluid composition at the outlet is then fed to a second reactor where the reaction is completed at 135° C. with an average residence time of 2 hours.

The resulting composition, which is hereafter referred to as "Composition (A)", having a conversion of 72%, is heated to 240° C. and subsequently fed to the devolatilizer to remove the solvent and residual monomer. It is characterized by a glass transition temperature of 104° C., a melt flow index (MFI 200° C., 5 kg) of 8 g/10', a molecular weight Mw of 200,000 g/mol and a Mw/Mn ratio of 2.8, wherein Mw is the weight average molecular weight and Mn is the number average molecular weight.

Composition (A) is fed, from the devolatilizer, to a heat exchanger to lower its temperature to 170° C.

120.7 parts of polystyrene N2982 produced by Polimeri Europa, 24.2 parts of BR-E 5300 (stabilized hexabromocyclododecane, sold by Chemtura) and 5.1 parts of Perkadox 30® (2,3-dimethyl-2,3-dihpenylbutane, sold by Akzo Nobel) for a total of 150 parts, are fed to a second twin-screw extruder. A gear pump increases the feeding pressure of this molten additive to 260 barg. 47 parts of a mixture of n-pentane (75%) and iso-pentane (25%) are then pressurized and injected into the feeding of the additive. The mixing is completed with the use of static mixers, at a temperature of about 190° C. The composition thus obtained is described hereunder as "Composition (B)".

Composition (B) is added to 850 parts of Composition (A) coming from the heat exchanger. The ingredients are then mixed by means of static mixing elements for a calculated average residence time of 7 minutes. The composition is then distributed to the die, where it is extruded through a number of holes having a diameter of 0.5 mm, immediately cooled with a jet of water and cut with a series of rotating knives (according to the method described in U.S. Pat. No. 7,320,585).

The pressure in the granulation chamber is 5 barg and the shear rate is selected so as to obtain granules having an average diameter of 1.2 mm. The water is used as a cooling spray liquid and nitrogen is used as carrier gas.

The resulting granules are dried with a centrifugal drier and then covered with a coating. The coating is prepared by adding to the granules 3 parts of glyceryl monostearate, 1 part of zinc stearate and 0.2 parts of glycerine per 1,000 parts of dried granules. The additives of the coating are mixed with the granulate by means of a continuous screw mixer.

The expansion of the granules and moulding were effected as described in Example 1. The thermal conductivity proved to be 32.0 mW/mK.

Some of the sheets, obtained as described in Example 1, are put in an oven at 70° C. for 2 days. Test samples are then collected (9 cm×19 cm×2 cm) for the fire behaviour test according to the regulation DIN 4102. The test samples pass the test.

EXAMPLE 8

68 parts of polystyrene N1782; 2 parts of ethylene-bis-stereamide; 30 parts of Needle Coke 4727 are mixed in a twin-screw extruder. The extruded product, hereafter referred to as composition "C", is used as master-batch, in the production of the expandable compositions of the present invention.

89.8 parts of ethylbenzene, 853.8 parts of styrene, 56.4 parts of α-methylstyrene (total: 1,000 parts) are fed to a stirred reactor.

The reaction is carried out at 125° C. with an average residence time of 2 hours. The outgoing fluid composition is then fed to a second reactor where the reaction is completed at 135° C. with an average residence time of 2 hours.

The resulting composition, hereafter referred to as "Composition D", having a conversion of 72%, is heated to 240° C. and subsequently fed to the devolatilizer to remove the solvent and residual monomer. The composition is fed, from the devolatilizer, to a heat exchanger to lower its temperature to 170° C.

120.7 parts of polystyrene N2982, 24.2 parts of BR-E 5300 (stabilized hexabromocyclododecane, sold by Chemtura), 5.1 parts of Perkadox 30® (2,3-dimethyl-2,3-dihpenylbutane, sold by Akzo Nobel) and 133.3 parts of composition C indicated above, for a total of 283.3 parts, are fed to a second twin-screw extruder. A gear pump increases the feeding pressure of this molten additive to 260 barg. 47 parts of a mixture of n-pentane (75%) and iso-pentane (25%) are then pressurized and injected into the feeding of the additive. The mixing is completed with static mixers, at a temperature of about 190° C.

The composition thus mixed is added to 716.7 parts of Composition (D) coming from the heat exchanger. The ingredients are then mixed by means of static mixing elements for a calculated average residence time of 7 minutes. The composition is then distributed to the die, where it is extruded through a number of holes having a diameter of 0.7 mm, immediately cooled with a jet of water and cut with a series of rotating knives as in Example 7, so as, however, to obtain granules having an average diameter of 1.4 mm.

The resulting granules are dried with a centrifugal drier and then covered with a coating, as described in previous Example 7.

The empty fraction f proved to be 7.7%, whereas the average diameter of the cavities, observed with the help of an optical microscope, is 15-60 μm.

The expansion of the granules and moulding were effected as described in Example 1. The thermal conductivity proved to be 31 mW/mK.

Some of the sheets, obtained as described in Example 1, are put in an oven at 70° C. for 2 days. Test samples are then collected (9 cm×19 cm×2 cm) for the fire behaviour test according to the regulation DIN 4102. The test samples pass the test.

EXAMPLE 9

926.5 parts of polystyrene N1782, 40 parts of Needle Coke 4727, 10 parts of HTP2 talc produced by Imi Fabi, 4 parts of Perkadox 30 and 19.5 parts of BR-E 5300 (total: 1,000 parts) are mixed in a twin-screw extruder.

The mixture thus obtained is brought to a pressure of 250 bar by means of a gear pump.

95 parts of the molten composition thus obtained are mixed with 5 parts of a mixture of n-pentane (75%) and iso-pentane (25%).

The resulting product is brought to a temperature of 160° C.; it is then granulated, dried and covered with a coating under the conditions described in Example 8.

The empty fraction proved to be 6.5%.

The expansion of the granules and moulding were effected as described in Example 1. The thermal conductivity proved to be 30.8 mW/mK.

Some of the sheets, obtained as described in Example 1, are put in an oven at 70° C. for 2 days. Test samples are then collected (9 cm×19 cm×2 cm) for the fire behaviour test according to the regulation DIN 4102. The test samples pass the test.

EXAMPLE 10

Example 7 was repeated increasing the concentration of coke 4023 from 123.8 parts to 247.6 parts. As in Example 7, the 247.6 parts of concentrate are fed to the reactor and dissolved (total: 1,000 parts). The thermal conductivity proved to be 30.5 mW/mK.

EXAMPLE 11

A mixture (A) consisting of 98 parts of polystyrene N1782 and 2 parts of Calcinated Coke 4023 of Example 1 is fed in continuous to a system of two extruders in series.

The temperature inside the first extruder is 220° C. to allow the polystyrene to melt and mix it with the additives.

2 parts of ethyl alcohol and 4 parts of carbon dioxide as expanding agent with respect to 100 parts of the mixture (A) are fed to the mixture thus obtained.

The polymeric melt comprising the expansion system is homogenized and cooled to 120° C. and extruded through a die having a rectangular transversal section and dimensions of 300 mm×1.5 mm.

A continuous sheet having a thickness of 120 mm is obtained. The density of the sheet is 35 g/l, the average size of the cells (substantially spherical) inside the sheet is about 500 μm. The thermal conductivity proved to be 34 mW/mK.

COMPARATIVE EXAMPLE 11

The same procedure is repeated as in Example 11 with the exception that no athermanous agent is incorporated.

The sheet obtained has a density of 35 g/l and an average size of the cells inside again of about 500 μm. The thermal conductivity proved to be 38 mW/mK.

The invention claimed is:

1. A composition, comprising an expandable vinyl aromatic polymer comprising:
(a) a polymeric matrix (a) obtained by polymerizing a base comprising 50-100% by weight of at least one vinyl aromatic monomer and 0-50% by weight of at least one co-polymerizable monomer;
(b) 1-10% by weight, calculated with respect to the polymeric matrix (a), of an expandable agent (b) englobed in the polymeric matrix (a); and
(c) 1-8% by weight, calculated with respect to the polymeric matrix (a), of at least one coke selected from the group consisting of a needle coke and a calcined coke, in particle form with an average diameter of particles ranging from 0.5 to 100 μm and with a surface area, measured according to ASTM D-3037/89 (BET), ranging from 5 to 50 $m^2/g$;
said at least one coke being homogeneously dispersed in the polymeric matrix (a); and
wherein expanded articles derived from said composition have a density ranging from 5 to 50 g/l and a thermal conductivity more than 10% lower than the same expanded articles without added athermanous filler.

2. The composition according to claim 1, further comprising:
from 0.1 to 8% by weight, with respect to the polymeric matrix (a), of a self-extinguishing brominated additive (d) comprising at least 30% by weight of bromine and 0.05 to 2% by weight, with respect to the polymeric matrix (a), of a synergic product comprising at least one labile C—C or O—O bond.

3. An expanded article having a density ranging from 5 to 50 g/l and a thermal conductivity ranging from 25 to 35 mW/mK, said article obtained from an expandable vinyl aromatic polymer comprising:
(a) a polymeric matrix (a) obtained by polymerizing a base comprising 50-100% by weight of at least one vinyl aromatic monomer and 0-50% by weight of at least one co-polymerizable monomer;
(b) 1-10% by weight, calculated with respect to the polymeric matrix (a), of an expandable agent (b) englobed in the polymeric matrix (a); and
(c) 1-8% by weight, calculated with respect to the polymeric matrix (a), of at least one coke selected from the group consisting of a needle coke and a calcined coke, in particle form with an average diameter of particles ranging from 0.5 to 100 μm and with a surface area, measured according to ASTM D-3037/89 (BET), ranging from 5 to 50 $m^2/g$;
said at least one coke being homogeneously dispersed in the polymeric matrix (a),
wherein said expanded article has a thermal conductivity more than 10% lower than the same expanded article without added athermanous filler.

4. The composition according to claim 1, wherein the expandable vinyl aromatic polymer is in the form of granules having a surface comprising at least one of an ionic surface active agent and a non-ionic surface active agent that comprises a condensate of ethylene oxide and propylene oxide.

5. The expanded article according to claim 3, wherein the expandable vinyl aromatic polymer is in the form of granules having a surface comprising at least one of an ionic and a non-ionic surface active agent that comprises a condensate of ethylene oxide and propylene oxide.

6. The composition of claim 1, which is in the form of granules, wherein the coke is homogenously dispersed in the granules.

7. The expanded article of claim 3, wherein the expandable vinyl aromatic polymer is in the form of granules, wherein the coke is homogenously dispersed in the granules.

8. The composition according to claim 1, wherein the coke has a surface area of from 5 to 20 $m^2/g$.

9. The expanded article according to claim 3, wherein the coke has a surface area of from 5 to 20 $m^2/g$.

10. The composition according to claim 1, which does not comprise graphite.

11. The expanded article according to claim 3, which does not comprise graphite.

12. The composition according to claim 1, comprising 4-8% by weight of the coke.

13. The expanded article according to claim 3, comprising 4-8% by weight of the coke.

14. The composition according to claim 1, in the form of thermally expandable pellets, wherein the coke is dispersed homogeneously in the pellets.

15. The composition according to claim 1, wherein expanded articles derived from said composition have a density ranging from 10 to 25 g/l and a thermal conductivity ranging from 25 to 35 mW/mK.

16. The composition according to claim 1, wherein extruded articles obtained from said composition have a density ranging from 20 to 40 g/l and a thermal conductivity ranging from 25 to 35 mW/mK.

17. The expanded article according to claim 3, having a density ranging from 20 to 40 g/l.

18. The expanded article according to claim 3, having a density ranging from 10 to 25 g/l.

19. The composition according to claim 1, wherein expanded articles obtained from said composition have a density from 10 to 25 g/l and a thermal conductivity ranging from 30.5 to 35 mW/mK.

20. The expanded article according to claim 3, having a density ranging from 10 to 25 g/l and a thermal conductivity ranging from 30.5 to 35 mW/mK.

21. A composition, comprising an expandable vinyl aromatic polymer comprising:
(a) a polymeric matrix (a) obtained by polymerizing a base comprising at least one vinyl aromatic monomer selected from the group consisting of styrene and α-methylstyrene;
(b) 1-10% by weight, calculated with respect to the polymeric matrix (a), of an expandable agent (b) englobed in the polymeric matrix (a); and
(c) 1-8% by weight, calculated with respect to the polymeric matrix (a), of at least one coke selected from the group consisting of a needle coke and a calcined coke, in particle form with an average diameter of particles ranging from 0.5 to 100 μm and with a surface area, measured according to ASTM D-3037/89 (BET), ranging from 5 to 50 $m^2/g$;
said at least one coke being homogeneously dispersed in the polymeric matrix (a); and
wherein expanded articles derived from said composition have a density ranging from 5 to 50 g/l and a thermal conductivity ranging from 25 to 35 mW/mK.

22. The composition according to claim 21, further comprising:
from 0.1 to 8% by weight, with respect to the polymeric matrix (a), of a self-extinguishing brominated additive (d) comprising at least 30% by weight of bromine and 0.05 to 2% by weight, with respect to the polymeric matrix (a), of a synergic product comprising at least one labile C—C or O—O bond.

23. An expanded article having a density ranging from 5 to 50 g/l and a thermal conductivity ranging from 25 to 35 mW/mK, said article obtained from an expandable vinyl aromatic polymer comprising:
(a) a polymeric matrix (a) obtained by polymerizing a base comprising at least one vinyl aromatic monomer selected from the group consisting of styrene and α-methylstyrene;
(b) 1-10% by weight, calculated with respect to the polymeric matrix (a), of an expandable agent (b) englobed in the polymeric matrix (a); and
(c) 1-8% by weight, calculated with respect to the polymeric matrix (a), of at least one coke selected from the group consisting of a needle coke and a calcined coke, in particle form with an average diameter of particles ranging from 0.5 to 100 μm and with a surface area, measured according to ASTM D-3037/89 (BET), ranging from 5 to 50 $m^2/g$;
said at least one coke being homogeneously dispersed in the polymeric matrix (a).

* * * * *